United States Patent Office 3,524,870
Patented Aug. 18, 1970

3,524,870
PREPARATION OF ALUMINUM MONOHYDRIDE DIETHOXIDE
Norman E. Matzek, Midland, and William H. Crawford, Gladwin, Mich., assignors to The Dow Chemical Company, Midland, Mich., a corporation of Delaware
No Drawing. Filed Dec. 8, 1967, Ser. No. 688,993
Int. Cl. C07f 5/06
U.S. Cl. 260—448    1 Claim

ABSTRACT OF THE DISCLOSURE

New organoaluminum compounds and their method of preparation wherein the compounds correspond to the formula $$H_nAl[OC_2H_5]_{n'}$$

where $n$ and $n'$ are the integers 1 and 2 and wherein when either one of $n$ or $n'$ is 1 the other integer is 2.

The novel compounds are useful as reducing agents, especially in organic chemical reactions. They can also be used as an aluminum source material for the plating of metallic aluminum onto various substrate materials.

The compounds can be prepared by reacting aluminum ethoxide with aluminum trihydride in an inert solvent to obtain a mixture of said compounds and reacting ethanol and aluminum trihydride in an inert solvent to obtain aluminum monohydride diethoxide.

SUMMARY OF THE INVENTION

New compounds corresponding to the formula $$H_nAl[OC_2H_5]_{n'}$$

wherein $n$ and $n'$ are the integers 1 and 2 and wherein when either one of $n$ or $n'$ is equal to 1 the other integer is 2.

The compounds can be prepared either by reacting aluminum trihydride and aluminum ethoxide in an inert solvent to obtain a mixture of said compounds and separating aluminum dihydride monoethoxide from said mixture, or by reacting ethanol and aluminum trihydride in an inert solvent to obtain aluminum monohydride diethoxide.

The novel compounds are white crystalline solids having a unique X-ray diffraction pattern consistent with the above indicated structures.

PREFERRED EMBODIMENTS

In the actual practice of the invention, usually an ether solution of ethanol, or solid aluminum ethoxide is added to an ether solution containing aluminum trihydride and the solution containing the reactants is agitated for a sufficient period of time to allow a substantially complete reaction to occur. Conveniently, the product precipitates from the reaction mass and readily is separated from the residual solution. Allowing the reaction mixture to stand or agitate for a prolonged period of time, i.e. 2 to 3 hours or more, has not been found to be detrimental to the products.

Ordinarily, following the reaction period, the ether solution is concentrated to assure optimum precipitation of the ethoxide product therein and the product removed by conventional separation methods, e.g. filtering under reduced pressure, and dried by evaporation.

The present compounds are ordinarily prepared under an inert, substantially anhydrous atmosphere such as, for example, nitrogen or argon.

The inert solvent usually employed is an alkyl ether and includes, for example, diethylether, n-dipropyl ether, diisopropyl ether, tetrahydrofuran, and other like solvents. The reaction is usually carried out at relatively mild temperatures, i.e. from about 20 to about 33° C. although higher or lower temperatures, at which the solvent is liquid, can be employed.

The reactants are ordinarily provided in about stoichiometric amounts for the preparation of the desired product.

The concentration of the solutions is not critical. Maximum concentrations are those such that the reactants are completely dissolved therein at the operating conditions. Extremely dilute solutions are not desired because of the difficulty of handling. Also, with such dilute solutions considerable time is required for formation and precipitation of desired products.

The following examples will facilitate a more complete understanding of the present invention but are not meant to limit it thereto.

Example 1.—Preparation of aluminum dihydride monoethoxide

Solid aluminum triethoxide [$(C_2H_5O)_3Al$] (8.1 grams) was slowly added to 500 ml. of diethyl ether solution, 0.2 molar with respect to aluminum trihydride. The reaction mixture was stirred for about two hours whereupon a white crystalline solid precipitated. The solid was separated from the solvent by filtering and dried under a reduced pressure.

The white solid was washed with a diethyl ether solution whereupon part of the solid dissolved into solution. Upon evaporation of the diethyl ether solution a white crystalline solid precipitated. Elemental analysis of this product gave C, 30.7 percent; H, 9.0 percent; Al, 36.3 percent and O, 24.0 percent. Calculated theoretical analysis for aluminum dihydride monoethoxide, $(C_2H_5O)AlH_2$, is C, 32.45 percent; H, 9.45 percent; Al, 36.45 percent; and oxygen, 21.65 percent.

X-ray powder diffraction gave a heretofore unknown pattern as presented in following Table I.

Table I

| $d$: | $I/I_1$ |
|---|---|
| 9.8 | 100 |
| 4.88 | 4 |
| 4.00 | 33 |
| 3.28 | 4 |
| 2.35 | 5 |
| 2.28 | 2 |
| 2.20 | 5 |
| 2.03 | 3 |
| 1.96 | 2 |
| 1.92 | 2 |
| 1.81 | 2 |
| 1.73 | 1 |
| 1.69 | 1 |
| 1.59 | 2 |
| 1.55 | 2 |
| 1.42 | 1 |
| 1.34 | 2 |

In Table I "$d$" represents the interplanar spacings of the plans in A. based upon Miller indices and "$I/I_1$" is the relation line intensity compared to the strongest line based at 100.

The product is soluble in diethyl ether.

Example 2.—Preparation of aluminum monohydride diethoxide

To 500 ml. of diethyl ether solution, 0.1 molar with respect to aluminum trihydride, at room temperature was added 200 ml. of diethyl ether, containing 0.3 cc. of ethanol. The solution was stirred for three hours and allowed to stand for about 20 hours whereupon a white crystalline precipitate was observed. The precipitate was separated from the solution and dried.

Elemental analysis of the solid product for carbon, hydrogen, oxygen and aluminum showed the elements to be present in the proper ratio for the compound aluminum monohydride diethoxide corresponding to the formula $(C_2H_5O_2)_2AlH$.

X-ray powder diffraction gave a heretofore unknown pattern as presented in following Table II.

Table II

| $d$: | $I/I_1$ |
|---|---|
| 7.7 | 100 |
| 6.75 | 70 |
| 4.91 | 45 |
| 4.26 | 57 |
| 3.80 | 57 |
| 3.28 | |

The "$d$" and "$I/I_1$" values are on the same basis as for Example I.

The product was insoluble in diethyl ether.

Various modifications may be made in the present invention without departing from the spirit or scope thereof for it is understood that we are limited only as defined in the appended claim.

What is claimed is:

1. A process for producing aluminum monohydride diethoxide which comprises:
   (a) contacting ethanol with aluminum trihydride under an inert substantially anhydrous atmosphere and in the presence of an inert solvent; and
   (b) reacting the reactants for a sufficient period of time such that monohydride diethoxide is formed.

References Cited

UNITED STATES PATENTS

| 3,060,216 | 10/1962 | Hamprecht et al. |
| 3,147,272 | 9/1964 | Brown et al. |
| 3,281,443 | 10/1966 | Hunt. |
| 3,405,154 | 10/1968 | Lundeen et al. |
| 3,435,059 | 3/1969 | Schmidt et al. |

FOREIGN PATENTS 1,246,620  10/1960  France.

TOBIAS E. LEVOW, Primary Examiner

H. M. S. SNEED, Assistant Examiner